United States Patent [19]

Yamaguchi et al.

[11] 4,377,733

[45] Mar. 22, 1983

[54] TEMPERATURE-SENSING PROBE STRUCTURE FOR WIRELESS TEMPERATURE-SENSING SYSTEM

[75] Inventors: Masumi Yamaguchi, Ikoma; Yoshimi Kumagai; Kazunari Kotaka, both of Tenri, all of Japan

[73] Assignee: Sharp Kabushiki Kaisha, Osaka, Japan

[21] Appl. No.: 70,729

[22] Filed: Aug. 29, 1979

[30] Foreign Application Priority Data

Aug. 31, 1978 [JP] Japan .............................. 53-107087
Oct. 12, 1978 [JP] Japan .......................... 53-140582[U]
Oct. 12, 1978 [JP] Japan .......................... 53-140583[U]
Jul. 31, 1979 [JP] Japan .............................. 54-98365

[51] Int. Cl.³ ......................... H05B 6/68; G01K 7/32
[52] U.S. Cl. .............................. 219/10.55 B; 219/516;
219/10.55 F; 324/61 QL; 374/117; 374/149;
374/155
[58] Field of Search .................. 219/10.55 B, 10.55 E,
219/10.55 D, 516; 310/311, 341, 343; 73/339
A, 352; 324/61 QL, 61 QS

[56] References Cited

U.S. PATENT DOCUMENTS 3,303,701 2/1967 Matsuura et al. .......... 324/61 QL X
3,519,924 7/1970 Burton ............................ 310/343 X
3,651,405 3/1972 Whitney et al. .................. 73/352 X
3,974,696 8/1976 Fitzmayer ................. 219/10.55 E X
4,037,070 7/1977 Kirpichnikov et al. .. 219/10.55 D X
4,081,645 3/1978 Javes et al. .................... 219/10.55 B
4,129,834 12/1978 Kerstens .................. 219/10.55 D X
4,230,731 10/1980 Tyler ....................... 219/10.55 B X
4,297,557 10/1981 Tyler et al. ............. 219/10.55 B X
4,340,796 7/1982 Yamaguchi et al. ......... 219/10.55 B

FOREIGN PATENT DOCUMENTS 2719588 11/1977 Fed. Rep. of Germany.. 219/10.55 B
53-64844 6/1978 Japan ............................ 219/10.55 B

*Primary Examiner*—A. D. Pellinen
*Assistant Examiner*—Keith E. George
*Attorney, Agent, or Firm*—Birch, Stewart, Kolasch and Birch

[57] ABSTRACT

A sensing element is adapted to monitor a temperature of a foodstuff placed within an oven cavity of a cooking utensil such as a microwave oven. The sensing element comprises a thermally-responsive element, an antenna, a double choke, and a trimmer condenser. The double choke is bent so as to provide a double compartment for causing choke operations. The double compartment contains a material the dielectric constant of which is higher than the air. A capacity of the trimmer condenser is adjustable. A resonance circuit or an oscillation circuit may be formed with the thermally-responsive element and the trimmer condenser. A metallic member is disposed adjacent to the antenna. The length of the antenna is selected as an integral multiple of about λ/2 (λ is the wavelength of the microwaves).

16 Claims, 19 Drawing Figures

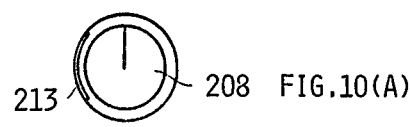
FIG.10(A)
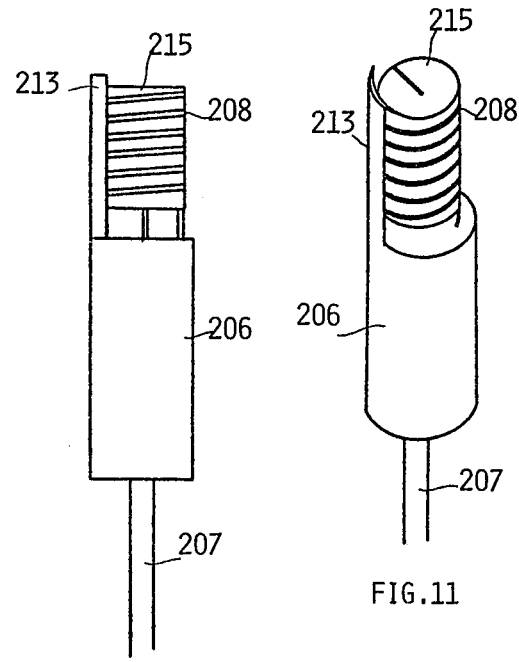
FIG.10(B)
FIG.11
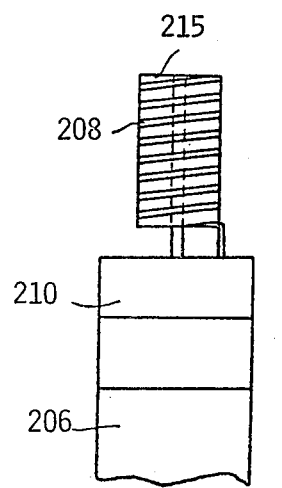
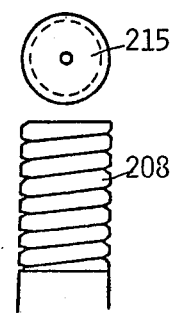
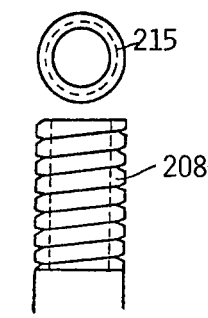
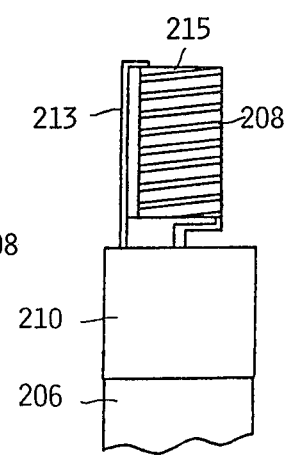
FIG.12
FIG.13(A)
FIG.13(B)
FIG.14

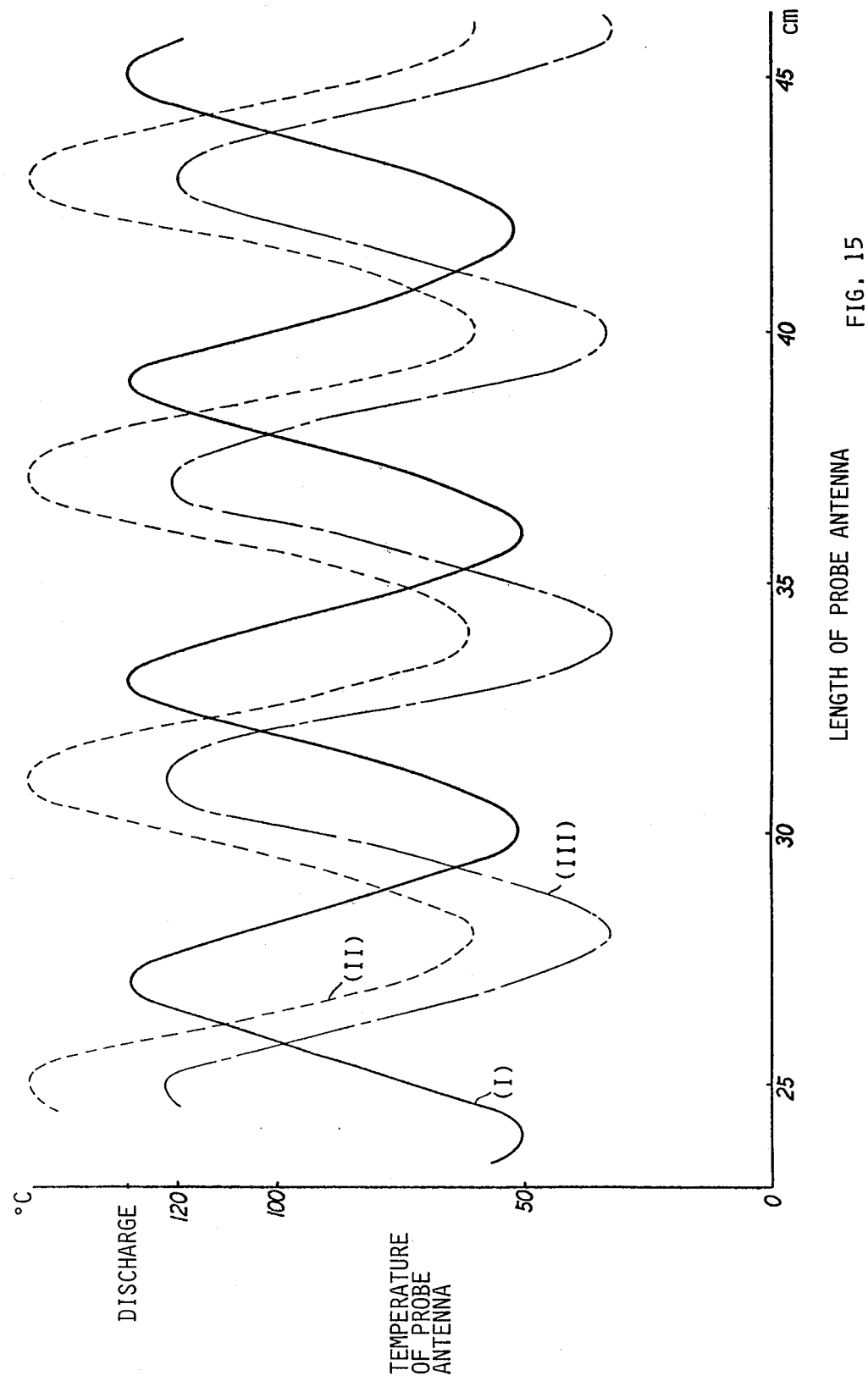

TEMPERATURE-SENSING PROBE STRUCTURE FOR WIRELESS TEMPERATURE-SENSING SYSTEM

BACKGROUND OF THE INVENTION

The present invention relates to a temperature-sensing element and, more particularly, to a temperature-sensing probe structure for a wireless temperature-sensing system for use in a cooking apparatus.

Recently, some wireless temperature-sensing systems have been suggested which contain new temperature-sensing probes for monitoring the temperature of a foodstuff being cooked. However, such temperature-sensing probes were considerably large, as disclosed in, for example, Jellis, U.S. Pat. No. 4,088,863 issued May 9, 1978, entitled "CORDLESS MEAT PROBE FOR MICROWAVE OVEN" and Perkins, U.S. Pat. No. 4,089,222 issued May 16, 1978, entitled "TEMPERATURE TELEMETRY FOR A SETTABLE COOKING PROBE".

Therefore, there has been a desire for minimizing the dimension of the conventional temperature-sensing probes to enhance their applicability to various fields.

SUMMARY OF THE INVENTION

Accordingly, it is the primary object of the present invention to provide an improved temperature-sensing probe for use in a wireless temperature-sensing assembly.

It is a further object of the present invention to provide an improved temperature-sensing probe which is compact. The temperature-sensing probe is incorporated within a wireless temperature-sensing assembly for use in a cooking apparatus such as a microwave oven.

It is a further object of the present invention to provide an improved temperature-sensing probe with the facility of adjusting the activating frequency for a circuit contained therein so that the circuit is energized in the greatest power in the activating frequency components.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To obtain the above objectives, pursuant to an embodiment of the present invention, a sensing element is adapted to monitor the temperature of a foodstuff placed within an oven cavity of a cooking utensil such as a microwave oven. The sensing element comprises a thermally-responsive element, an antenna, a double choke, and a trimmer condenser. The double choke is bent so as to provide a double compartment for causing choke operations. The double compartment contains a material the dielectric constant of which is higher than that of air. The capacity of the trimmer condenser is adjustable.

A resonance circuit or an oscillation circuit may be formed with the thermally-responsive element and the trimmer condenser. A metallic member is disposed adjacent the antenna. The length of the antenna is selected as an integral multiple of about $\lambda/2$ ($\lambda$ is the wavelength of the microwaves).

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 10(A), 10(B) and 11 are several views of the temperature-sensing probe shown in FIG. 9;

FIGS. 12, 13(A), 13(B), and 14 are several views of the temperature-sensing probes which are examined to obtain the following data; and FIG. 15 is a graph indicative of the temperature v. length of antenna elements contained within the temperature-sensing probes illustrated in FIGS. 12, 13(A), 13(B) and 14.

DESCRIPTION OF THE PREFERRED EMBODIMENTS

Figure 1:
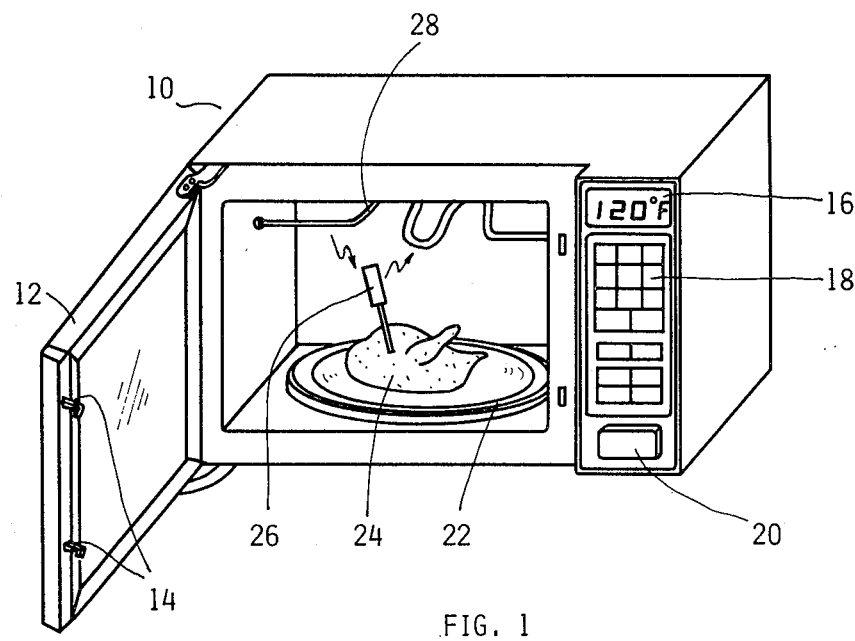
FIG. 1 is a perspective view of a cooking apparatus, in particular, a microwave oven containing a wireless communication system.

Primarily, an application of the present invention is not limited to a microwave oven although so indicated throughout in the drawings. The present wireless monitoring system can be readily applied to any cooking utensil such as a combination of a microwave oven and other heat-source ovens. For convenience of description, the present invention is described hereinafter with reference to the microwave oven.

FIG. 1 shows a perspective view of a microwave oven 10 containing a wireless communication system according to the present invention. The microwave oven 10 comprises a door 12, door latch elements 14, a turntable 22, a door-open switch 20, and a control panel unit containing a key input unit 18 and a display 16. A foodstuff 24 is disposed on the turntable 22. A sensing probe 26 is inserted into the foodstuff 24 to monitor an inner temperature of the foodstuff 24. A sheath heater 28 as a browner is used to cause wireless communication in relation with the sensing probe 26.

Figure 2:
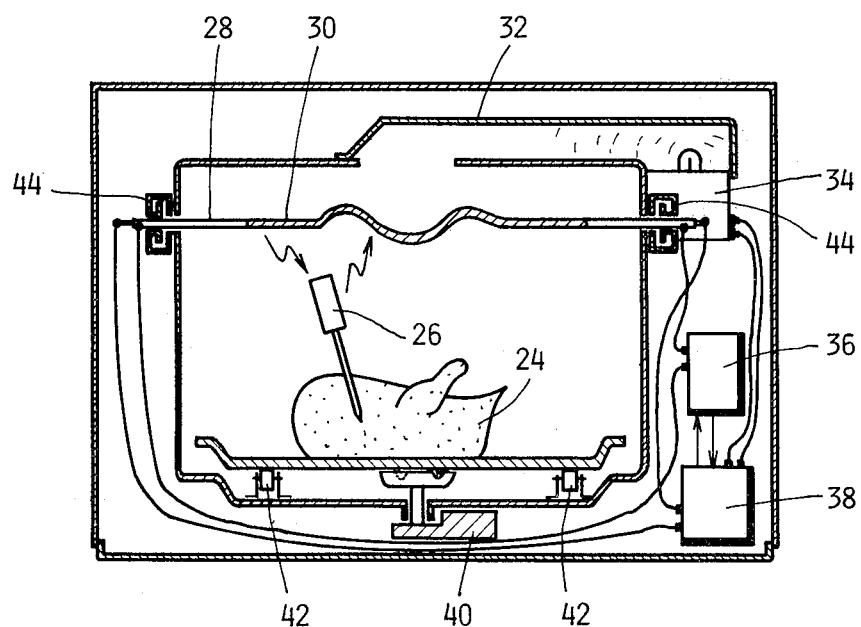
FIG. 2 is a cross-sectional view of the cooking apparatus shown in FIG. 1.

FIG. 2 shows a cross-sectional view of the microwave oven 10. There are provided within the microwave oven 10, the sensing probe 26 inserted into the foodstuff 24, the sheath heater 28 containing a heating element 30, a wave guide 32, a magnetron 34, a wireless communication unit 36, a power control unit 38, a turntable motor 40, a pair of supporting rollers 42, and a pair of choke housings 44.

In addition to a conventional microwave oven, there is provided within the microwave oven 10 a wireless communication system according to the present invention for monitoring an inner temperature of the foodstuff 24. The wireless communication system comprises the sheath heater 28, the wireless communication unit 36, and the sensing probe 26.

The wireless communication unit 36 provides a series of signals in a like manner as in the well known Phase Lock Loop (PLL) system using a Voltage Controlled Oscillator (VCO). This PLL-VCO system is featured by producing the series of signals the frequency of which increases accurately by a predetermined degree, say, about 1 KHz each lapse of a certain period of time, for example, about 8.3 msec according to an example of the present invention. The sheath heater 28 is provided for transmitting the series of signals from the wireless communication unit 36 to the sensing probe 26. The inner temperature of the foodstuff 24 is monitored by means of the wireless communication system as described below.

Figure 3:
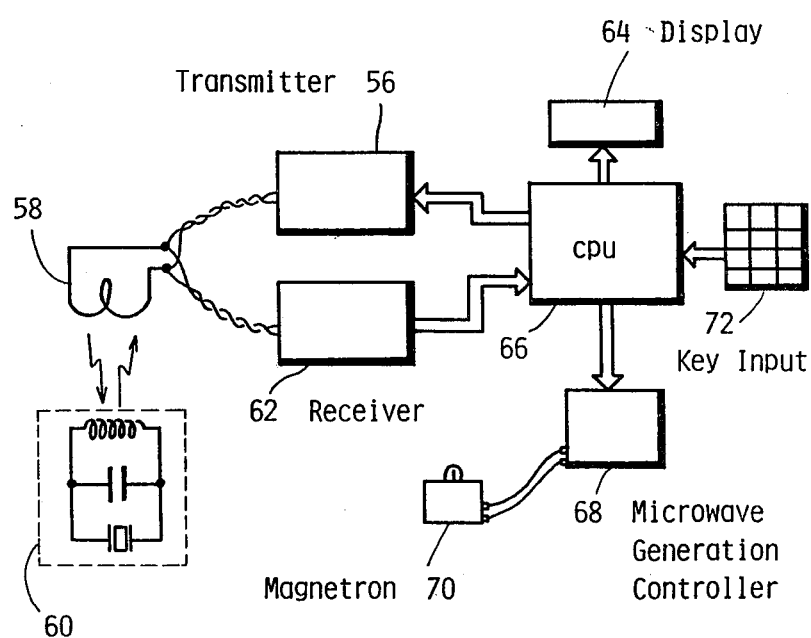
FIG. 3 is a block diagram of the wireless communication system.

FIG. 3 shows a principle block diagram of the present wireless communication system. The wireless communication system comprises an antenna 58, an LC resonance circuit 60, a transmitter 56, a reciever 62, a central processing unit (CPU) 66, a display 64, a key input unit 72, a microwave generation controller 68, and a magnetron 70.

The antenna 58 is related to the sheath heater 28 of FIGS. 1 and 2. The LC resonance circuit 60 is provided for causing resonance operations.

The transmitter 56, the receiver 62, and the CPU 66 are contained within the wireless communication unit 36 of FIG. 2. The transmitter 56 is provided for transmitting the series of signals from the CPU 66. The receiver 62 is employed to receive the resonance frequency developed from the LC resonance circuit 60 in resonance operations. The resonance operations are utilized for detecting or identifying an inner temperature of the foodstuff 24.

The resonance frequency detected by the receiver 62 is transferred to the CPU 66 so that the generating resonance frequency is changed to temperature information corresponding to the detected inner temperature. The CPU 66 preliminarily stores information so as to alter the detected resonance frequency to the temperature information.

The temperature information is momentarily indicated in the display 64 which is related to the display 16 of FIG. 1. The key input unit 72 is related to the key input unit 18 of FIG. 1. The key input unit 72 is provided for introducing particular temperature information into the CPU 66. The CPU 66 activates the microwave generation controller 68 for providing microwave energy until the particular temperature information is determined in the CPU 66. According to the difference between the detected temperature information with the aid of the receiver 62 and the particular temperature information stored in the CPU 66, the CPU 66 controls the microwave generation controller 68 to energize the magnetron 70 for driving purposes.

Figure 4:
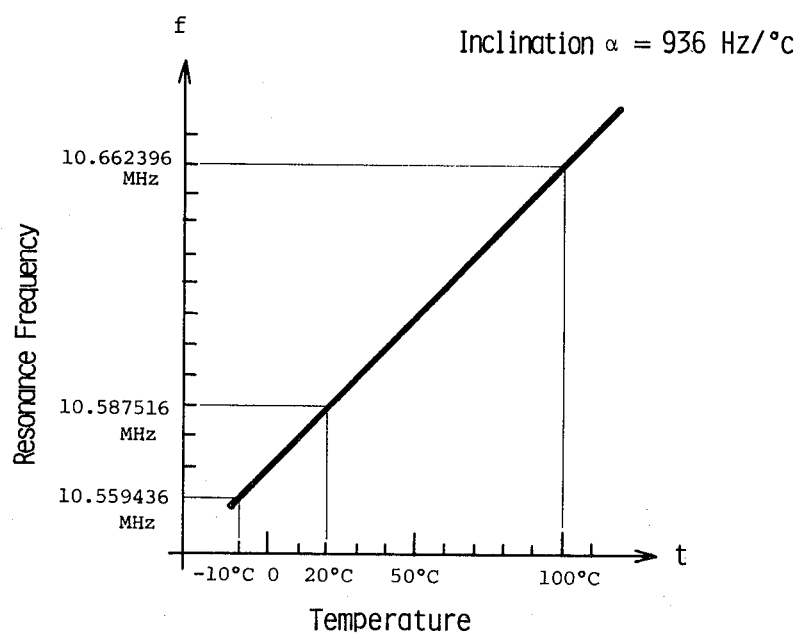
FIG. 4 is a graph showing resonance characteristics of an oscillator for detecting the temperature of a foodstuff cooked within the cooking apparatus shown in FIGS. 1 and 2.

FIG. 4 indicates a graph showing resonance properties of a crystal oscillator depending on a temperature. As obviously noted from the graph of FIG. 4, the crystal oscillator has the resonance frequency accurately proportional to the temperature value. For instance, the crystal oscillator show the resonance frequencies at some temperature values: 10.559436 MHz at $-10°$ Centigrade; 10.587516 MHz at 20° Centigrade; and 10.662396 MHz at 100° Centigrade. That is, the inclination $\alpha = 936$ Hz/°centigrade. These characteristics of the crystal oscillator (that its resonance frequency varies accurately responsive to the particular temperature value) are utilized in the present wireless communication system.

To produce these characteristics, a predetermined volume of a rock crystal is cut so as to change its number of proper vibration dependent on the surrounding temperature. For example, in accordance with this embodiment, YS-cutting is available with a cut angle 5° apart from that of Y-cut plane. The crystal oscillator is incorporated into the resonance circuit to increase Q in the resonance circuit since Q of the crystal oscillator is very high.

The resonance frequency of the resonance circuit containing the crystal oscillator is constantly part from that of the crystal oscillator per se at a predetermined number of frequency, say, 1 KHz concerning overall temperature. In other words, the resonance frequency of the resonance circuit containing the crystal oscillator accurately corresponds to that of the crystal oscillator per se. Therefore, the detected resonance frequency of the resonance circuit inclusive of the crystal oscillator identifies a specific inner temperature of the foodstuff 24.

In place of the crystal oscillator, any ceramic oscillator can be utilized inasmuch as the ceramic oscillator may have characteristics that its resonance frequency varies precisely in accordance with the surrounding temperature value. Needless to say, other temperature-responsive elements can be replaced since they may have the same characteristics in its resonance operations as the crystal oscillator. The resonance operations should not be limited to a linear property, non-linear resonance operations being available.

Figure 5:
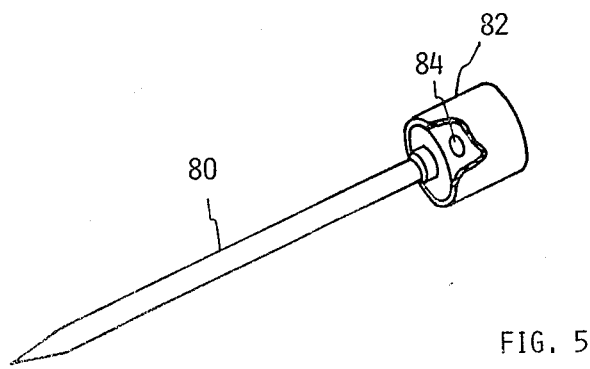
FIG. 5 is a perspective view of a temperature-sensing probe implemented by the wireless communication system.

FIG. 5 illustrates a specific form of the sensing probe 26 in a perspective view. With reference to FIG. 5, the sensing probe 26 comprises an tubular housing 80 and a handle housing 82. In a cover inner to the handle housing 82, there is an opening 84 through which a screw driver is inserted so as to adjust the capacity of a trimmer condenser contained within the sensing probe 26. The capacity is fixed so that the resonance circuit included within the sensing probe 26 can provide the greatest intensity of any of the resonance frequency components. After completion of the adjustment for the capacity, the opening 84 is sealed with a screw made of metal etc.

FIG. 6 shows a cross-sectional view of the sensing probe 26 of FIG. 5. There are contained within the tubular housing 80, an oscillator 301, a tube 302, a tip end 303, and a lead line 312.

The oscillator 301 is disposed adjacent the tip end 303 of the tube 302. The oscillator 301 is used to mean the crystal oscillator, the ceramic oscillator and the other temperature-responsive elements mentioned with respect to FIG. 4. With reference to FIG. 6, on the other hand, in the handle housing 82, there are provided a metallic protecting tube 304, two cavities 305 and 306, a coil antenna 307, a circuit board 309, a lead line 310, and a choke structure 311. A condenser 308 is mounted on the circuit board 309.

The coil antenna 307 is contained within the cavity 305 so that it receives the electromagnetic waves for wireless communication and transmits the resonance frequency defined by the resonance circuit contained within the sensing probe 26. The circuit board 309 is accommodated within the cavity 306. The lead line 310 connects the coil antenna 307 to the circuit board 309. The lead line 312 connects the oscillator 301 to the circuit board 309. The choke structure 311 is needed to prevent microwave signals from invading into the internal circuit elements of the sensing probe 26 as is well-known in the art. The choke structure 311 is provided in such a manner as to surround the lead 310.

The present invention is featured in that the choke structure 311 is doubled so as to minimize the volume of the sensing probe 26. The choke structure 311 is disposed between the coil antenna 307 for the wireless communication and the resonance circuit comprising the oscillator 301 and the condenser 308 except for a conductance element consisting of the coil antenna 307.

A non-metallic cover 314 is provided for assuring handling of the sensing probe 26 even when the metallic protecting tube 304 is heated by heat from the cooked foodstuff 24.

Figure 6A:
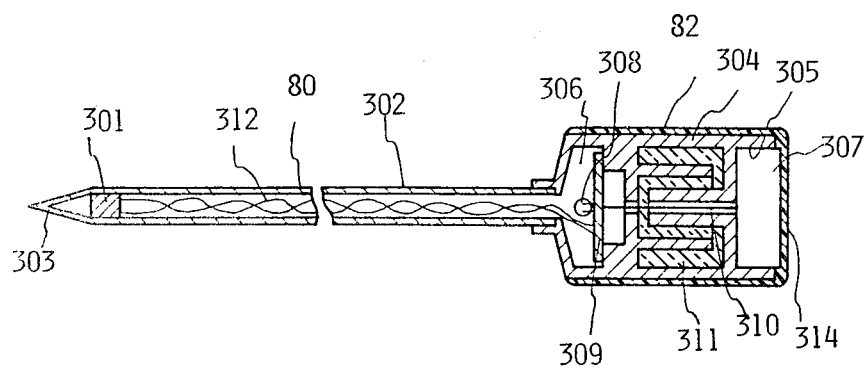
FIG. 6(A) is a fragmentary view of the temperature-sensing probe shown in FIG. 5.
Figure 6B:
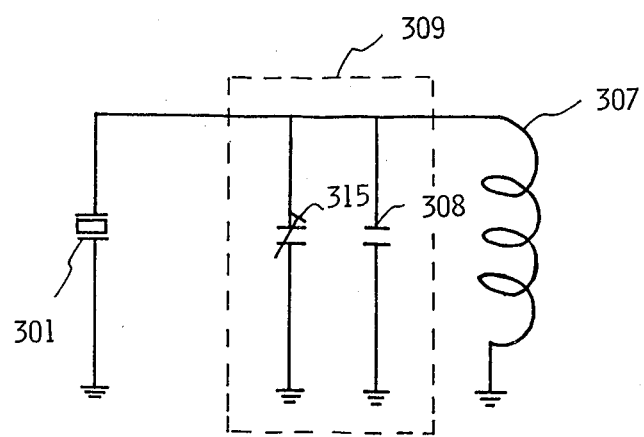
FIG. 6(B) is a circuit configuration of a resonance circuit contained within the temperature-sensing probe shown in FIGS. 5 and 6(A)

FIG. 6(B) illustrates a circuit configuration of the resonance circuit contained within the sensing probe 26. Like elements corresponding to those of FIG. 6(A) are indicated by like numerals. A trimmer condenser 315 is disposed on the circuit board 309 in parallel with the condenser 308. The capacity of the trimmer condenser 315 is adjusted by means of a screw driver. Through the adjustment of the capacity of the trimmer condenser 315, the resonance circuit comprising the oscillator 301, the condenser 308, the trimmer condenser 315, and the coil antenna 307 provides the greatest intensity of any resonance frequency components. The oscillator 301 is incorporated within the resonance circuit so as to increase Q of the resonance circuit since the oscillator 301 shows a very high value of Q.

It is not necessary that the sensing probe 26 contain any power battery for driving the resonance circuit. The resonance circuit responds to the electromagnetic waves applied thereto. In addition, the provision of the trimmer condenser 315 affords the advantage that output levels of the resonance frequency component of the overall resonance circuit are maintained at a suitable degree and that the crystal oscillator 301 incorporated within the resonance circuit can be energized at a frequency adjacent to the resonance frequency of the crystal oscillator 301 per se.

Figure 7:
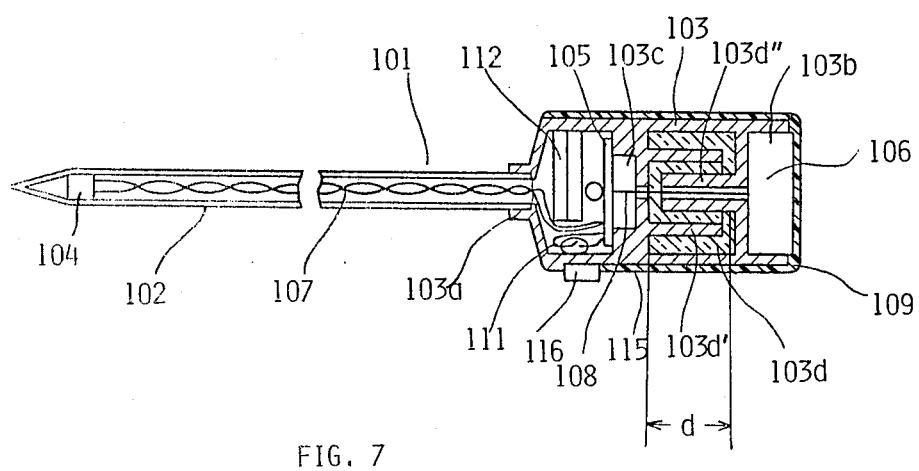
FIG. 7 is a fragmentary view of another temperature-sensing probe substantially similar to that of FIG. 6(A)

FIG. 7 shows a cross-sectional view of another specific temperature-sensing probe 101 substantially similar to that of FIG. 6(A). With reference to FIG. 7, the temperature-sensing probe 101 comprises a tube 102, a connector portion 103a, a handle housing 103 containing two cavities 103b and 103c, and a choke structure 103d. The tube 102 contains an oscillator 104 near the tip end, the oscillator 104 being composed of crystal, ceramic, or the like. The oscillator 104 of FIG. 7 is related to the oscillator 301 of FIG. 6(A).

Within the cavity 103c, there is contained a circuit board 105, a power battery 112, and a lead switch 111. The cavity 103b contains a coil antenna 106. The choke structured 103d is structured by means of a projection 103d' from a portion near the cavity 103c and another projection near the cavity 103c and another projection 103d" from a portion adjacent to the cavity 103b.

A distance "d" within the choke structure 103d is selected as λ/8 to provide the choke structure 103d. The choke structure 103d is doubled to minimize the overall volume of the temperature-sensing probe 101.

A lead line 107 is provided for connecting the oscillator 104 to circuit elements contained within the circuit board 105. Another lead line 108 is employed to connect the coil antenna 106 to the circuit elements of the circuit board 105.

A switch actuator 116 is provided for turning on and off the lead switch 111. The switch actuator 116 made of a magnet is movably mounted on a guide 115 formed on a protecting film 109. The protecting film 109 covers the handle housing 103 and the coil antenna 106 for protecting purposes. The protecting film 109 is made of synthetic resin or the like. A trimmer condenser is one of the circuit elements of the temperature-sensing assembly of FIG. 7. In that case, an adjustment opening similar to the opening 84 shown in FIG. 5 should be provided for adjusting purposes.

Figure 8B:
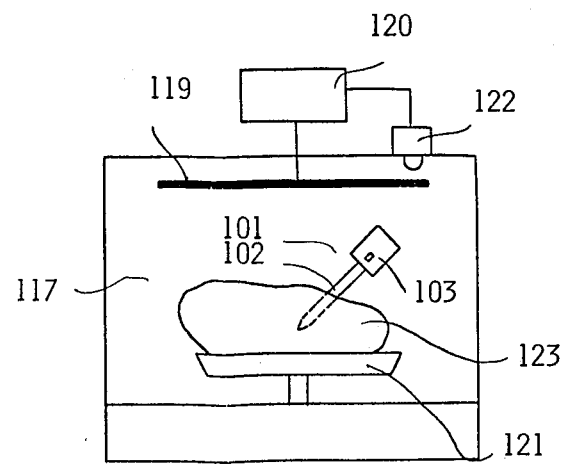
FIG. 8(B) is a block diagram of a cooking apparatus using the temperature-sensing probe shown in FIG. 7.
Figure 8A:
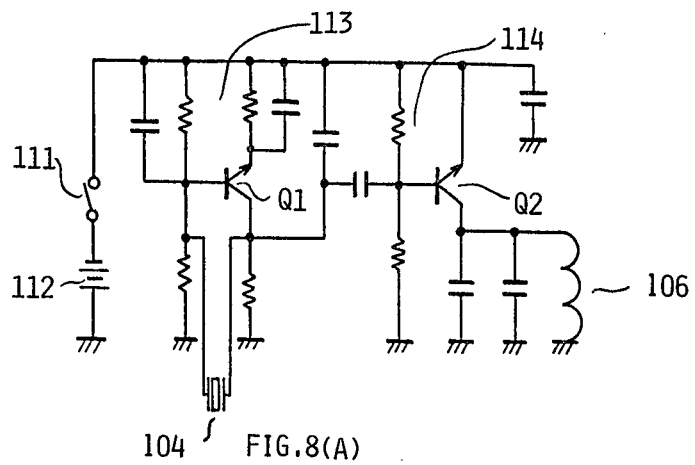
FIG. 8(A) is a circuit configuration of an oscillation circuit contained within tne temperature-sensing probe shown in FIG. 7.

FIG. 8(A) shows a circuit configuration of an oscillation circuit contained within the temperature-sensing probe 101. Like elements corresponding to those of FIG. 7 are indicated by like numerals. The oscillation circuit comprises an oscillation unit 113 mainly containing a transistor Q1 and an amplifier circuit 114 mainly including another transistor Q2. The oscillation unit 113 receives power energy from the power battery 112 in response to actuation of the lead switch 111.

The oscillation unit 113 oscillates according to the resonance frequency of the oscillator 104 which is dependable on the surrounding temperature. The amplifier circuit 114 amplifies output signals from the oscillation unit 113 applied to the coil antenna 106 for transmitting purposes.

FIG. 8(B) shows a block diagram of a wireless communication system using the present temperature-sensing probe 101 shown in FIGS. 7 and 8(A) applied to a cooking apparatus, in particular, a microwave oven. The wireless communication system comprises the temperature-sensing probe 101, an oven antenna 119, a control unit 120, and an energization circuit 122. The temperature-sensing probe 101 includes the tube 102 and the handle housing 103. The tube 102 is is inserted into a foodstuff 123 disposed on a turntable 121 contained within an oven cavity 117.

The temperature-sensing probe 101 is inserted within the foodstuff 123 under the condition that the lead switch 111 is turned on. The oscillation unit 113 oscillates according to the operation of the oscillator 104 depending on the surrounding temperature. The oscillation output signals are amplified by the amplifier circuit 114 in such a manner as that the coil antenna 106 transmitts signals indicative of temperature information within the oven cavity 117.

The generated signals are received by means of the oven antenna 119 within the oven cavity 117. Output signals from the oven antenna 119 are admitted to the control unit 120 where the detected signals are converted to temperature information. The control unit 120 stores preliminarily preset temperature information up to which the cooking apparatus should be energized or heated. The control unit 120 regulates the energization circuit 122 to zero the difference between the detected temperature information and the present temperature information.

To further minimize the length of the handle housing 103, it is advantageous that the choke structure 103d contains a material having a higher dielectric constant than that of air. Such a material makes it possible to shorten the wave length of signals radiating in the material in inverse proportion to the value of the dielectric constant. Therefore, the length of the handle housing 103 containing the choke structure 103d can be minimized. In such a case, the choke structure 103d is not limited to the double choke configuration. Other types of choke structures can be also minimized in size with such the material.

The material is selected from tetrafluoroethylene polymer, P.P.O. (Polypropylene oxide) thynthetic resin (each $\epsilon \approx 2.6-3.0$), ceramic ($\epsilon \approx 9.0$), and the like.

A further improvement of the temperature-sensing probe will be described hereinbelow, the improvement being effective for preventing heat generation within the afore-mentioned coil antenna.

Figure 9:
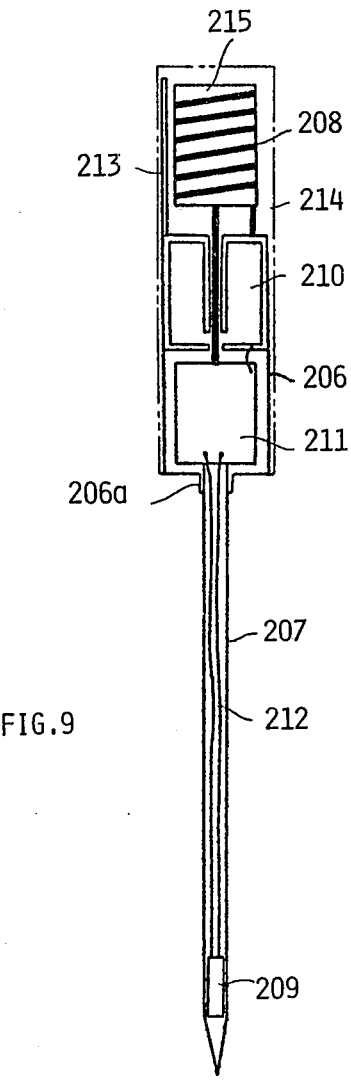
FIG. 9 is a fragmentary view of a further temperature-sensing probe similar to that of FIGS. 6(A) and 7.

The temperature-sensing probe shown in FIGS. 9, 10(A), 10(B) and 11 is related to that of FIGS. 6(A) and 7. FIG. 9 is a cross-sectional view of the temperature-sensing probe assembly. FIG. 10(A) is a top view of the inner structure and FIG. 10(B) is a side view of the same. FIG. 11 is a perspective view of the inner structure.

With reference to FIGS. 9, 10(A), 10(B) and 11 the temperature-sensing probe comprises a handle tube 206, a connection portion 206a, a needle-like tube 207, a probe antenna 208, a temperature-responsive element 209, a choke structure 210, a circuit board 211, a lead line 212, a metallic film 213, and a protecting cover 214. The probe antenna 208 surrounds a bobbin 215 made of synthetic resin. All the elements except for the metallic film 213 are mentioned above and description for these elements is omitted.

The metallic film 213 is disposed adjacent to and along the probe antenna 208. The length of the probe antenna 208 is selected so that a kind of a resonance circuit comprising the probe antenna 208 and the choke structure 210 etc. does not cause resonance. The length of the probe antenna 208 can be determined from the outcomes of the following examinations.

Examination Method

A specific type of the temperature-sensing probe containing a constant configuration of the choke structure 210 is disposed on a turntable of a microwave oven. Various types of the temperature-sensing probes as mentioned below are examined in turn. The microwave oven provides its output of 650 W. With rotating the turntable, the temperature-sensing probe which is not inserted to the foodstuff is subject to the microwave energy for a minute. Then the surface temperature of the temperature-sensing probe is determined with a thermometer. The surrounding temperature during the determination is maintained at about 20° to 22° Centigrade. The protecting cover 214 is removed for convenience only.

Examination I

As viewed from FIGS. 12 and 13(A), the probe antenna 208 is wound around a rod-like bobbin 215. The length of the probe antennas 208 varies from 24 cm to 45 cm with a difference of 1 cm. The respective 22 temperature-sensing probes containing the varying-length probe antennas 208 are tested according to the above mentioned examination method. The data (I) in FIG. 15 are obtained with the temperature of the probe antenna (°Centigrade) as ordinate and the length of the probe antenna (cm) as abscissa.

The data (I) indicate that the lowest temperature of about 50° Centigrade develops in connection with the length of the probe antennas 208 of about 24, 30, 36 and 42 cm.

Examination II

As shown in FIGS. 12 and 13(B), the probe antenna 208 is wound around a tube-like bobbin 215. The length of the probe antennas 208 varies in the same manner as mentioned in the examination I. The examination method is further repeated to obtain the data (II) in FIG. 15.

The data (II) show that the lowest temperature of about 60° Centigrade is higher than that of data (I) and obtained with reference to the length of the probe antennas of about 28, 34 and 40 cm.

Examination III

As indicated in FIG. 14, the probe antenna 208 is wound around the rod-like bobbin 215. In addition, the metallic film 213 is disposed along the side of the probe antenna 208 and connected to the handle tube 206. The length of the probe antennas 208 is changed as stated above. The temperature-sensing probes each containing the thus constructed probe antenna 208 and the metallic film 213 are tested according to the examination method to obtain the data (III) in FIG. 15.

It is noted from the results of the examinations (I) to (III) that irrespective of the configuration of the bobbin 215 and the presence of the metallic film 213, the temperature of the probe antenna 208 is periodically changed according to the difference of about 6 cm. The value of about 6 cm corresponds to λ/2 (λ: the wavelength of the microwaves). In other words, the degree of the propagation of the microwave upon the probe antenna 208 varies according to the change in the length of the probe antenna 208 of about 6 cm, namely, λ/2. The length of the probe antenna 208 where the microwave is prevented from propagating is defined as the length for restricting the resonance operations in a kind of the resonance circuit comprising the probe antenna 208 and the choke structure 210, etc.

Besides, the provision of the metallic film 213 prevents the temperature of the probe antenna 208 from increasing due to the microwave energy. It is considered that the metallic film 213 protects the probe antenna 208 from exposure of the microwave energy, thus preventing the generation of heat in the probe antenna 208.

A current density flowing through the probe antenna 208 or a coil looped antenna is lowered with the aid of the metallic film 213. Heating operations by magnetic induction caused on the probe antenna 208 are minimized. Discharge between wires in the probe antenna 208 is then restricted. The probe antenna 208 is prevented with efficiency from being self-heated. The current density passing the probe antenna 208 is further minimized with the selection of the length of the probe antenna 208 that the degree of the propagation of the microwave upon it can be minimized.

While only certain embodiments of the present invention have been described, it will be apparent to those skilled in the art that various changes and modifications may be made therein without departing from the spirit and scope of the invention as claimed.

What is claimed is:

1. Wireless temperature sensing means for monitoring the cooking temperature of a foodstuff in a microwave cooking apparatus, comprising:
transmitter means for propagating electromagnetic waves within said microwave cooking apparatus over a range of selectively discrete frequencies;
each one of said discrete frequencies corresponding to a particular cooking temperature value;
wireless probe means insertable in and responsive to the cooking temperature of a said foodstuff and a particular discrete frequency from said transmitter means for receiving and repropagating an electromagnetic wave of said particular discrete frequency corresponding to said cooking temperature value as a measure of the latter; and
detection means for receiving said repropagated electromagnetic wave of said particular frequency and providing an output signal representative of said cooking temperature value of said foodstuff.

2. The wireless temperature sensing means according to claim 1, wherein said wireless probe means is devoid of any power source.

3. The wireless temperature sensing means according to claim 1, wherein said wireless probe means comprises:
elongated probe tip means for inserting into a said foodstuff and including a thermally responsive oscillator element means at one end thereof having a resonant frequency linearly variable with the said cooking temperature value of said foodstuff;
probe body means at the other end of said elongated probe tip means for housing capacitance means and inductance means forming a resonant circuit means with said oscillator element means, the resonant frequency of said resonant circuit means being controlled by said oscillator element means in response to said cooking temperature value;
said inductance means acting as an antenna means for receiving and repropagating said electromagnetic waves of said particular discrete frequencies;
capacitance choke means in said probe body means separating said inductance means from the remainder of said resonant circuit means to isolate said remainder from microwave signals in said microwave cooking apparatus.

4. The wireless temperature sensing means according to claim 1, wherein said capacitance choke means comprises a doubled coaxial cavity choke structure having an axial cavity length of at least λ/8 where λ is the wavelength of said microwave signals.

5. The wireless temperature sensing means according to either claim 1 or 2, wherein said inductance means is so physically proportioned with respect to said capacitance choke means as to preclude resonance therebetween in response to said microwave signals.

6. The wireless temperature sensing means according to either claim 1 or 2, wherein said inductance means is so physically proportioned with respect to said capacitance choke means as to preclude resonance therebetween in response to said microwave signals; and wherein said wireless probe means is devoid of any power source.

7. The wireless temperature sensing means according to claims 1 or 2, wherein said wireless probe means is devoid of any power source.

8. The wireless temperature sensing means according to either claim 1 or 2, wherein said remainder of said resonant circuit means further includes trimming capacitor means for selectively broadening the response of said resonant circuit means to frequencies closely proximate to said particular discrete frequencies.

9. The wireless temperature sensing means according to either claim 1 or 2, wherein said remainder of said resonant circuit means further includes trimming capacitor means for selectively broadening the response of said resonant circuit means to frequencies closely proximate to said particular discrete frequencies; and
wherein said inductance means is so physically proportioned with respect to said capacitance choke means as to preclude resonance therebetween in response to said microwave signals.

10. The wireless temperature sensing means according to either claim 1 or 2, wherein said remainder of said resonant circuit means further includes trimming capacitor means for selectively broadening the response of said resonant circuit means to frequencies closely proximate to said particular discrete frequencies; and
wherein said wireless probe means is devoid of any power source.

11. The wireless temperature sensing means according to either claim 1 or 2, wherein said remainder of said resonant circuit means further includes trimming capacitor means for selectively broadening the response of said resonant circuit means to frequencies closely proximate to said particular discrete frequencies; and further, wherein said wireless probe means is devoid of any power soruce.

12. Cooking control means for monitoring the cooking temperature and controlling the cooked temperature of a foodstuff in a microwave cooking apparatus, comprising;
microwave source means for providing microwave energy to said apparatus;
transmitter means for propagating electromagnetic waves within said microwave cooking apparatus over a range of selectively discrete frequencies;
each one of said discrete frequencies corresponding to a particular cooking temperature value;
wireless probe means insertable in and responsive to the cooking temperature of a said foodstuff and a particular discrete frequency from said transmitter means for receiving and repropagating an electromagnetc wave of said particular discrete frequency corresponding to said cooking temperature value as a measure of the latter.
detection means for receiving said repropogated electromagnetic wave of said particular frequency and providing an output signal representative of said cooking temperature valve of said foodstuff;
said detection means including comparison means containing a reference parameter representative of a desired cooked temperature value of said foodstuff and being responsive to said output signal to compare said cooking temperature value with said desired cooked temperature value to provide a difference signal representative of the difference in said values; and
means responsive to said difference signal for controlling the microwave energy provided by said microwave source means to achieve said desired cooked temperature of said foodstuff.

13. The cooking control apparatus according to claim 12, wherein said comparison means further includes input means for selectively loading a said reference parameter therein representative of any desired cooked temperature value.

14. The cooking control means according to either claim 12 or 13, which further comprises display means responsive to said output signal from said detection means for displaying said cooking temperature value.

15. The cooking control means according to either claim 12 or 13, which further comprises sheath heater means in said microwave cooking apparatus for effecting a browning of a said foodstuff;
said sheath heater means further comprising an antenna for said transmitter means.

16. The cooking control means according to either claim 12 or 13, which further comprises sheath heater means in said microwave cooking apparatus for effecting a browning of a said foodstuff;
said sheath heater means further comprising an antenna for said transmitter means; and
display means responsive to said output signal from said detection means for displaying said cooking temperature value of said foodstuff.

* * * * *